United States Patent
Park et al.

(10) Patent No.: US 8,406,320 B2
(45) Date of Patent: Mar. 26, 2013

(54) DIGITAL CLIPPING METHOD FOR A TRANSMITTER OF AN ORTHOGONAL FREQUENCY DIVISION MULTIPLE ACCESS SYSTEM

(75) Inventors: Hyeong-Sook Park, Daejeon (KR); Youn-Ok Park, Daejeon (KR)

(73) Assignees: Samsung Electronics Co., Ltd., Suwon-Si (KR); Electronics and Telecommunications Research Institute, Daejeon (KR); KT Corp., Seongnam (KR); SK Telecom Co., Ltd., Seoul (KR); KTFreetel Co., Ltd., Seoul (KR); Hanaro Telecom, Inc., Seoul (KR)

(*) Notice: Subject to any disclaimer, the term of this patent is extended or adjusted under 35 U.S.C. 154(b) by 608 days.

(21) Appl. No.: 11/721,156

(22) PCT Filed: Oct. 26, 2005

(86) PCT No.: PCT/KR2005/003575
§ 371 (c)(1),
(2), (4) Date: Nov. 16, 2009

(87) PCT Pub. No.: WO2006/062291
PCT Pub. Date: Jun. 15, 2006

(65) Prior Publication Data
US 2010/0046662 A1 Feb. 25, 2010

(30) Foreign Application Priority Data

Dec. 11, 2004 (KR) .................. 10-2004-0104646
May 10, 2005 (KR) .................. 10-2005-0038845

(51) Int. Cl.
*H04L 27/28* (2006.01)
(52) U.S. Cl. ........ 375/260; 375/259; 375/295; 375/298; 375/316; 375/261
(58) Field of Classification Search .................. 375/260, 375/259, 295, 298, 308, 261, 279, 316
See application file for complete search history.

(56) References Cited

U.S. PATENT DOCUMENTS

| | | | |
|---|---|---|---|
| 6,044,117 A * | 3/2000 | Muto | 375/295 |
| 7,395,034 B2 * | 7/2008 | Teramoto | 455/116 |
| 2004/0165524 A1 * | 8/2004 | Chen et al. | 370/208 |
| 2004/0234006 A1 * | 11/2004 | Leung | 375/316 |

FOREIGN PATENT DOCUMENTS

EP 1458159 B1 3/2007

* cited by examiner

*Primary Examiner* — Kenneth Lam
(74) *Attorney, Agent, or Firm* — Jefferson IP Law, LLP (57) ABSTRACT

The present invention relates to a digital clipping method for reducing a high peak-to-average power ratio (PAPR) of a transmission signal in a transmitter of an orthogonal frequency division multiplexing access (OFDMA) system. In the method, a) the transmission signal to be digitally clipped is divided into real and imaginary parts, b) magnitudes of the real and imaginary part signals are divided into a plurality clipping levels, and c) the transmission signal is respectively clipped by comparing the real and imaginary part signals with the plurality of clipping levels while allowing phase errors. In c), a plurality of comparators is used to respectively compare the real and imaginary parts of the complex number transmission signal with the plurality of clipping levels.

5 Claims, 6 Drawing Sheets

DIGITAL CLIPPING METHOD FOR A TRANSMITTER OF AN ORTHOGONAL FREQUENCY DIVISION MULTIPLE ACCESS SYSTEM

TECHNICAL FIELD

The present invention relates to a digital clipping method for a transmitter of an orthogonal frequency division multiplexing access (OFDMA) system. More particularly, the present invention relates to a digital clipping method for reducing a high peak-to-average power ratio (PAPR) of a transmission signal in an OFDMA system.

BACKGROUND ART

As the prior art, Korean Patent Application No. 2001-88387 discloses an invention entitled "Method and apparatus for PAPR reduction using soft-clipping method in OFDM wireless communication system"

In the patent, the apparatus reduces the PAPR by soft-clipping a signal of an inverse fast Fourier transform output, in which the clipping operation is not performed when the signal is less than a soft-clipping starting point and the clipping operation is performed by a disclosed equation when the signal is between the soft-clipping starting point and a soft-clipping ending point. At this time, a multiplier and a divider are required. Accordingly, the PAPR is reduced by clipping the signal without signal distortion so as to prevent distortion in a band and deterioration caused by an out-of-band clipping noise.

In addition, PCT Publication No. Wo03/041327 (filed Nov. 9, 2002) discloses an invention entitled "Apparatus and method for reducing PAPR in an OFDM mobile communication system".

In the OFDM mobile communication system, a transmitter pre-emphasizes an output signal of an IFFT block, and a receiver de-emphasizes a received signal before FFT, thereby efficiently reducing PAPR due to multiple subcarriers. When the output signal of the IFFT block is greater or less than a predetermined value, the signal is determined by transmission functions respectively multiplied by different gains. That is, when the transmission signal S(n) is converted to a signal Spre(n) through a transmission function of pre-emphasis, the receiver performs de-emphasis for converting the received signal Spre(n) to the signal S(n). Accordingly, the apparatus is formed by a digital signal process (DSP) since it is required to perform many calculations.

In addition, a paper entitled "PAPR reduction using soft clipping and ACI rejection in OFDM system" has been published in IEEE Transaction on Consumer Electronics, vol. 48, pp. 17-22, February 2002

In the paper, the soft clipping method rather than a hard clipping is suggested to reduce the PAPR of the OFDM transmission signal, in which the soft clipping is performed in a like manner of the above patent. That is, the soft clipping is performed between the soft-clipping starting and ending points. A filtering operation using additional FFT and IFFT processes to remove clipping noise is performed since the clipping causes clipping noise in the transmission signal. The filtering operation removes the out-of-band noise, but the noise in the band still exists. IFFT and FFT units are additionally provided so as to filter the clipped transmission signal.

In a method for clipping a complex number transmission signal to reduce the PAPR of the transmission signal in the OFDMA system, the clipping operation is performed without any phase error by dividing real and imaginary parts by a calculated magnitude of a complex number transmission signal.

However, it is complicated since the multiplier and the divider operate for every sample, and therefore signals of the real and imaginary parts are separately clipped, allowing a phase error in the method. The method is ideal for clipping signals, but a hardware configuration therefor may be complicated.

In another method for clipping the complex number transmission signal, while the signals of the real and imaginary parts are separately clipped without an additional multiplier and divider, there is a problem in that the phase error is allowed and the PAPR on the same clipping level is still great.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a clipper having appropriate clipping levels for reducing a hardware size and a peak-to-average power ratio PAPR in an orthogonal frequency division multiplexing access system, and to provide a digital clipping method thereof for reducing power consumption of a transmitter.

Technical Solution

In an exemplary digital clipping method for clipping an orthogonal frequency division multiplexing (OFDM) transmission signal in an orthogonal frequency division multiplexing access (OFDMA) system according to an embodiment of the present invention, a) the transmission signal is divided into real and imaginary parts, b) magnitudes of the real and imaginary part signals are divided into clipping sections, and c) real and imaginary parts of the transmission signal are clipped by comparing the real and imaginary parts with a plurality of clipping levels while allowing a phase error.

In c), a plurality of comparators are used to respectively compare the real and imaginary parts of the complex number transmission signal with the plurality of clipping levels.

Two comparators are used to compare the real and imaginary parts with three clipping levels when three clipping levels A, L1, and L2 are provided as the plurality of clipping levels.

The clipping sections in b) are divided by the first, second, and third clipping levels A, L1, and L2, where L1 is given as $L1 = A \times 1/\sqrt{2}$ and L2 is given as $L2 = A \times \sqrt{2}(-1)$.

The clipped real part y(n) of the signal yi(n) in c) is given as $$y_i(n) = \begin{cases} A, & \text{if } x_i(n) > A, |x_q(n)| < L_2 \\ x_i(n), & \text{if } |x_i(n)| \le A, |x_q(n)| < L_2 \\ -A, & \text{if } x_i(n) < -A, |x_q(n)| < L_2 \\ L_1, & \text{if } x_i(n) > L_1, |x_q(n)| \ge L_2 \\ x_i(n), & \text{if } |x_i(n)| \le L_1, |x_q(n)| \ge L_2 \\ -L_1, & \text{if } x_i(n) < -L_1, |x_q(n)| \ge L_2. \end{cases}$$

Advantageous Effects

According to the exemplary embodiment of the present invention, compared to the conventional clipping method, a digital clipper having further improved performance may be provided in a transmitter of an orthogonal frequency division multiplexing access (OFDMA) system.

According to the exemplary embodiment of the present invention, the hardware of the transmitter may be reduced by designing according to a transmitter design method of the OFDMA system, and the PAPR may be reduced.

BEST MODE FOR CARRYING OUT THE INVENTION

An embodiment of the present invention will hereinafter be described in detail with reference to the accompanying drawings.

Hereinafter, a digital clipping method in a transmitter of an orthogonal frequency division multiplexing access (OFDMA) system according to an exemplary embodiment of the present invention will be described with reference to the figures.

Figure 1:
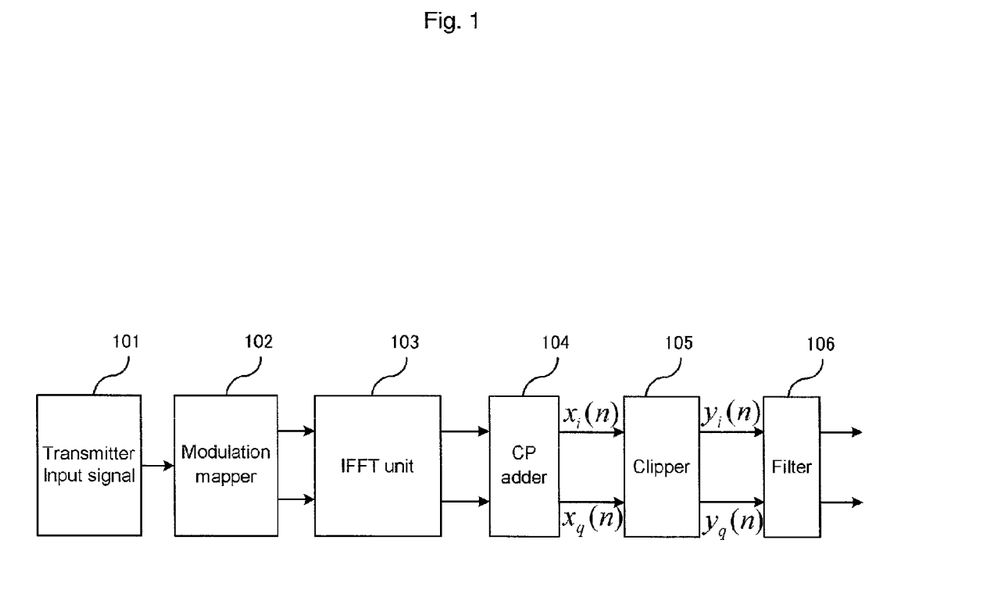
FIG. 1 shows a block diagram of a configuration of a conventional transmitter in an orthogonal frequency division multiplexing access (OFDMA) system.

FIG. 1 shows a block diagram of a configuration of a conventional transmitter in an OFDMA system.

The transmitter receives an input signal 101 inputted as a burst from a transmitter, and arranges data of the signal as orthogonal frequency division multiplexing (OFDM) symbols. A modulation mapper 102 performs modulation mapping on the signal according to modulation methods including a quadrature phase shift keying (QPSK), a 16 quadrature amplitude modulation (16 QAM), and a 64 quadrature amplitude modulation (64 QAM).

An inverse fast Fourier transform (IFFT) unit 103 performs an IFFT operation on the mapped signal as the OFDM symbols, and a cyclic prefix (CP) adder 104 adds a CP to the signal. A clipper 105 performs clipping on the signal, and a transmission signal x(n) is expressed by a real part xi(n) and an imaginary part jxq(n) as shown in Math Figure 1.

$$x(n)=x_i(n)+jx_q(n) \qquad \text{Math Figure 1}$$

In addition, a clipped signal y(n) is expressed by a real part yi(n) and an imaginary part jyq(n) as shown in Math Figure 2.

$$y(n)=y_i(n)+jy_q(n) \qquad \text{Math Figure 2}$$

Accordingly, the signal may be expressed as shown in Math Figure 3 when the clipping is ideally performed without any phase error.

$$y(n) = \begin{cases} \dfrac{A}{\sqrt{|x(n)|^2}} x(n), & \text{if } |x(n)|^2 > A^2 \\ x(n), & \text{if } |x(n)|^2 < A^2 \end{cases} \qquad \text{MathFigure 3}$$

where A denotes a clipping level. When the clipping is performed as shown above, an in-band noise and an out-of-band noise occur.

In addition, the clipping level may be expressed relating to signal average power, and a ratio between the clipping level and the signal average power is referred to as a clipping ratio which is defined as Math Figure 4.

$$CR=20 \cdot \log_{10}[A/\sigma_i], \qquad \text{Math Figure 4}$$

where $$\sigma_x^2$$

denotes variance of the transmission signal x(n).

To clip without the phase error as shown in Math Figure 4, it is required to find the signal magnitude. Then, a clipping signal is obtained by respectively multiplying the real and imaginary parts by the signal magnitude, which is shown by Type I in FIG. 2.

Figure 2:
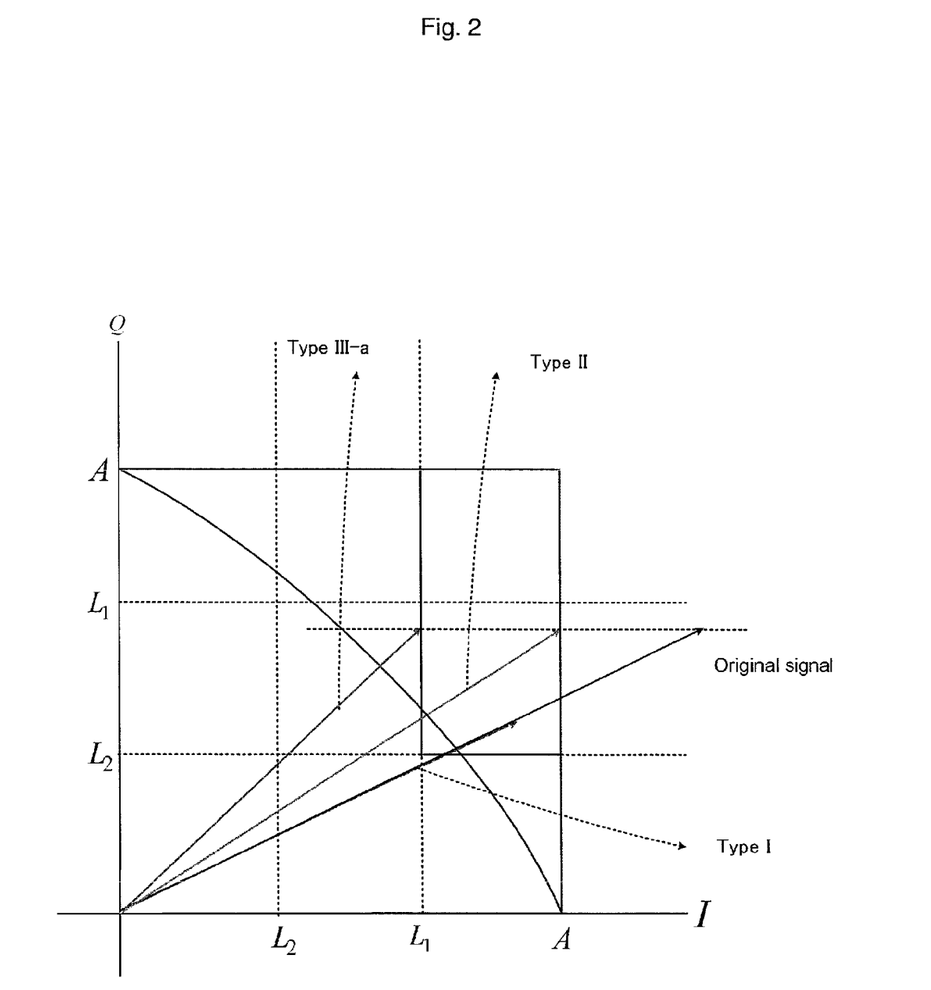
FIG. 2 shows a graph for representing a method for clipping a transmission signal according to an exemplary embodiment of the present invention.

FIG. 2 shows a graph for representing a method for clipping a transmission signal according to an exemplary embodiment of the present invention.

Type II in FIG. 2 shows a method for separately clipping the real and imaginary part signals so as to reduce the complexity of a hardware configuration. The clipped real part signal is as shown in Math Figure 5. The clipped imaginary part signal is also applied in a like manner of the real part signal.

$$y_i(n) = \begin{cases} A, & \text{if } x_i(n) > A \\ x_i(n), & \text{if } |x_i(n)| \le A \\ -A & \text{if } x_i(n) < -A \end{cases} \qquad \text{MathFigure 5}$$

While the clipping is performed by using a comparator without the multiplier and divider in the above method, there is a problem in that the PAPR is not reduced by a large amount, which will be described with reference to FIG. 5 and FIG. 6.

Accordingly, a method for clipping by adding comparators while allowing the phase error in the exemplary embodiment of the present invention will be described.

As shown in Types in FIG. 2, the clipping operation may be separately applied for each section defined by the clipping levels, and may variously be changed.

A clipping method of Type III-a shown in FIG. 2 is expressed as shown in Math Figure 6.

$$y_i(n) = \begin{cases} A, & \text{if } x_i(n) > A, |x_q(n)| < L_2 \\ x_i(n), & \text{if } |x_i(n)| \le A, |x_q(n)| < L_2 \\ -A, & \text{if } x_i(n) < -A, |x_q(n)| < L_2 \\ L_1 & \text{if } x_i(n) > L_1, |x_q(n)| \ge L_2 \\ x_i(n), & \text{if } |x_i(n)| \le L_1, |x_q(n)| \ge L_2 \\ -L_1 & \text{if } x_i(n) < -L_1, |x_q(n)| \ge L_2 \end{cases}$$ MathFigure 6

Referring to FIG. 2, the clipped real part signal yi(n) has one of six values according to each section defined by a first clipping level A, a second clipping level L1, and a third clipping level L2. That is, the clipped real part signal yi(n) has one among A, xi(n), -A, L1, xi(n), and -L1 according to the values of the real part xi(n) and imaginary part jxq(n) of the transmission signal x(n) as shown in Math Figure 1, and the first, second, and third clipping levels A, L1, and L2. The first, second, and third clipping levels A, L1, and L2 will be described later in further detail.

Figure 3:
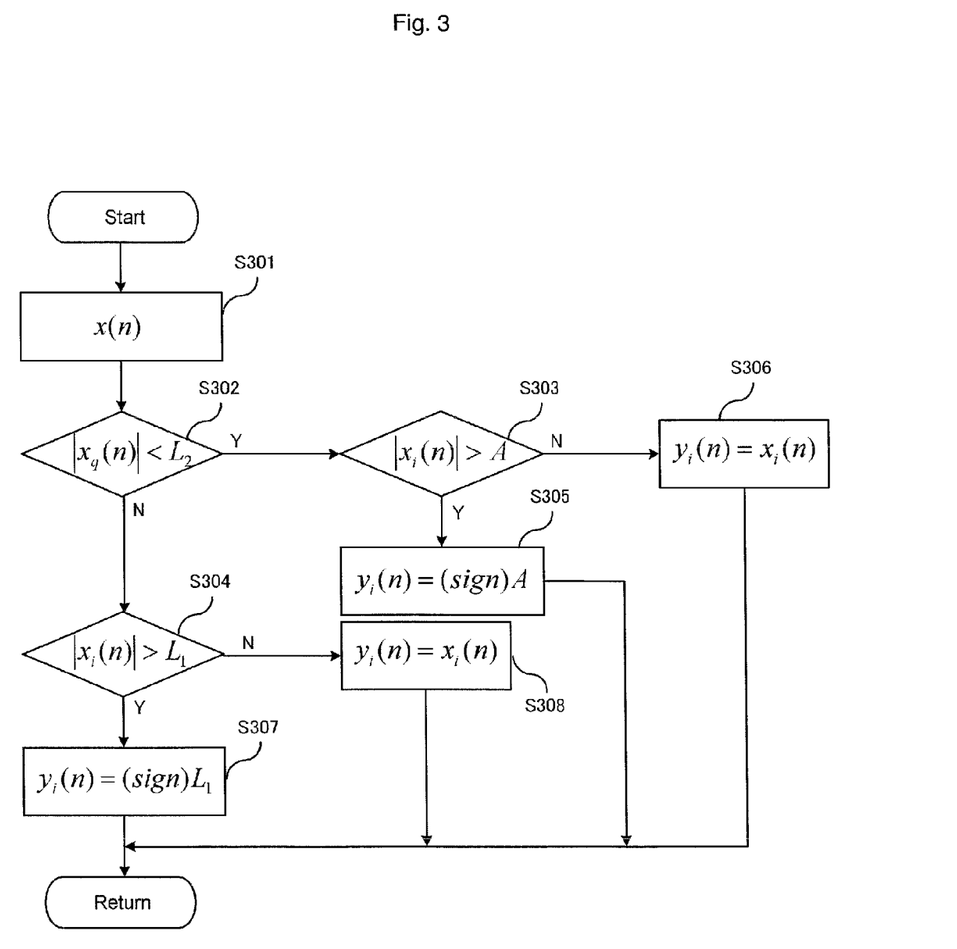
FIG. 3 shows a flowchart for representing a digital clipping operation in a transmitter of an OFDMA system.

FIG. 3 shows a flowchart for representing a digital clipping operation in a transmitter of an OFDMA system.

Referring to FIG. 3, clipping values in steps S305 to S308 are respectively outputted by performing comparison in steps S302 to S304 according to Math Figure 6 when the digital clipping on the transmission signal x(n) is performed in steps S301. That is, the clipping value has one of A, xi(n), -A, L1, xi(n), and -L1.

Figure 4:
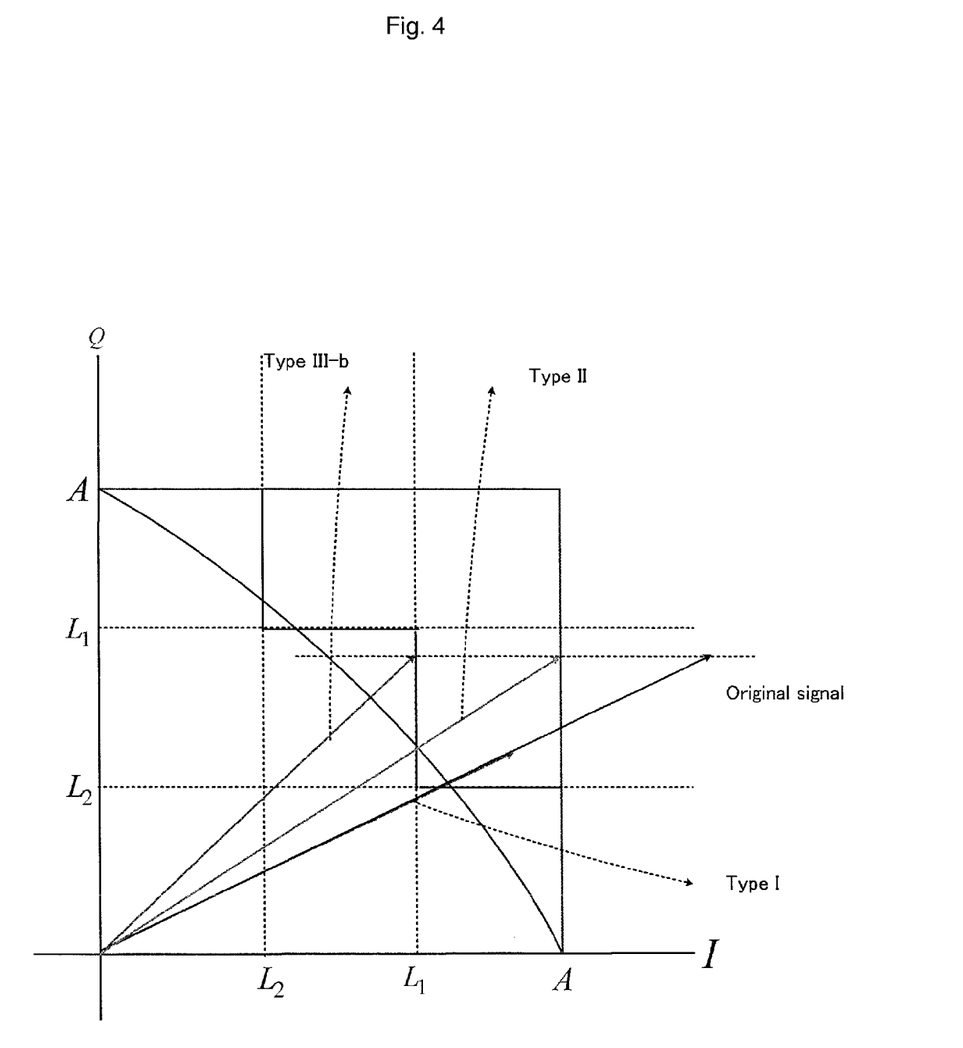
FIG. 4 shows a graph for representing a method for clipping a transmission signal according to another exemplary embodiment of the present invention.

FIG. 4 shows a graph for representing a method for clipping a transmission signal according to another exemplary embodiment of the present invention.

As shown in FIG. 4, Type III-b is an extended case, which is shown as Math Figure 7.

$$y_i(n) = \begin{cases} A, & \text{if } x_i(n) > A, |x_q(n)| < L_2 \\ x_i(n), & \text{if } |x_i(n)| \le A, |x_q(n)| < L_2 \\ -A, & \text{if } x_i(n) < -A, |x_q(n)| < L_2 \\ L_1 & \text{if } x_i(n) > L_1, L_2 \le |x_q(n)| < L_1 \\ x_i(n), & \text{if } |x_i(n)| \le L_1, L_2 \le |x_q(n)| < L_1 \\ -L_1 & \text{if } x_i(n) < -L_1, L_2 \le |x_q(n)| < L_1 \\ L_2 & \text{if } x_i(n) > L_2, |x_q(n)| < L_1 \\ x_i(n), & \text{if } |x_i(n)| \le L_2, |x_q(n)| < L_1 \\ -L_2 & \text{if } x_i(n) < -L_2, |x_q(n)| < L_1. \end{cases}$$ MathFigure 7

In further detail, the clipped real part signal yi(n) has one of 9 values according to each clipping section defined by the first, second, and third clipping levels A, L1, and L2. That is, the clipped real part signal yi(n) has one among A, xi(n), -A, L1, xi(n), -L1, L2, xi(n), and -L2 according to the values of the real part xi(n) and imaginary part jxq(n) of the transmission signal x(n) as shown in Math Figure 1, and the first, second, and third clipping levels A, L1, and L2. Comparing Math Figure 7 with Math Figure 6, the clipping value additionally has L2, xi(n), and -L2, which vary according to a user setting condition.

Figure 5:
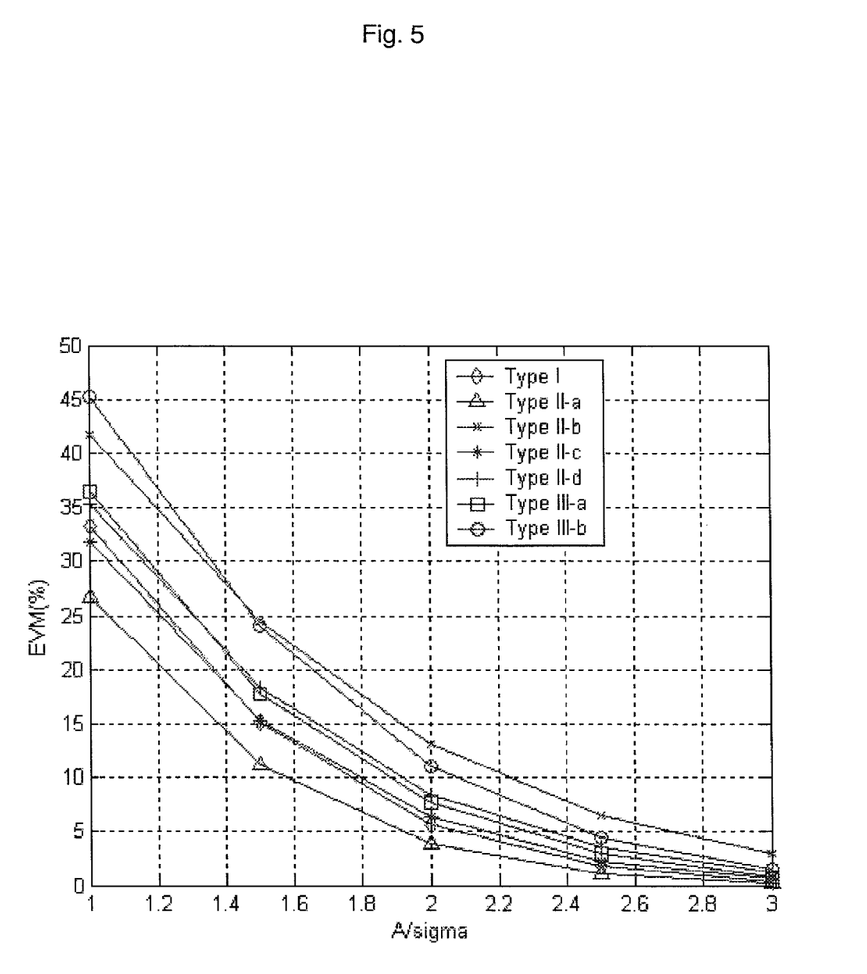
FIG. 5 shows a graph for representing error vector magnitude (%) in the method for clipping the transmission signal according to the exemplary embodiment of the present invention.
Figure 6:
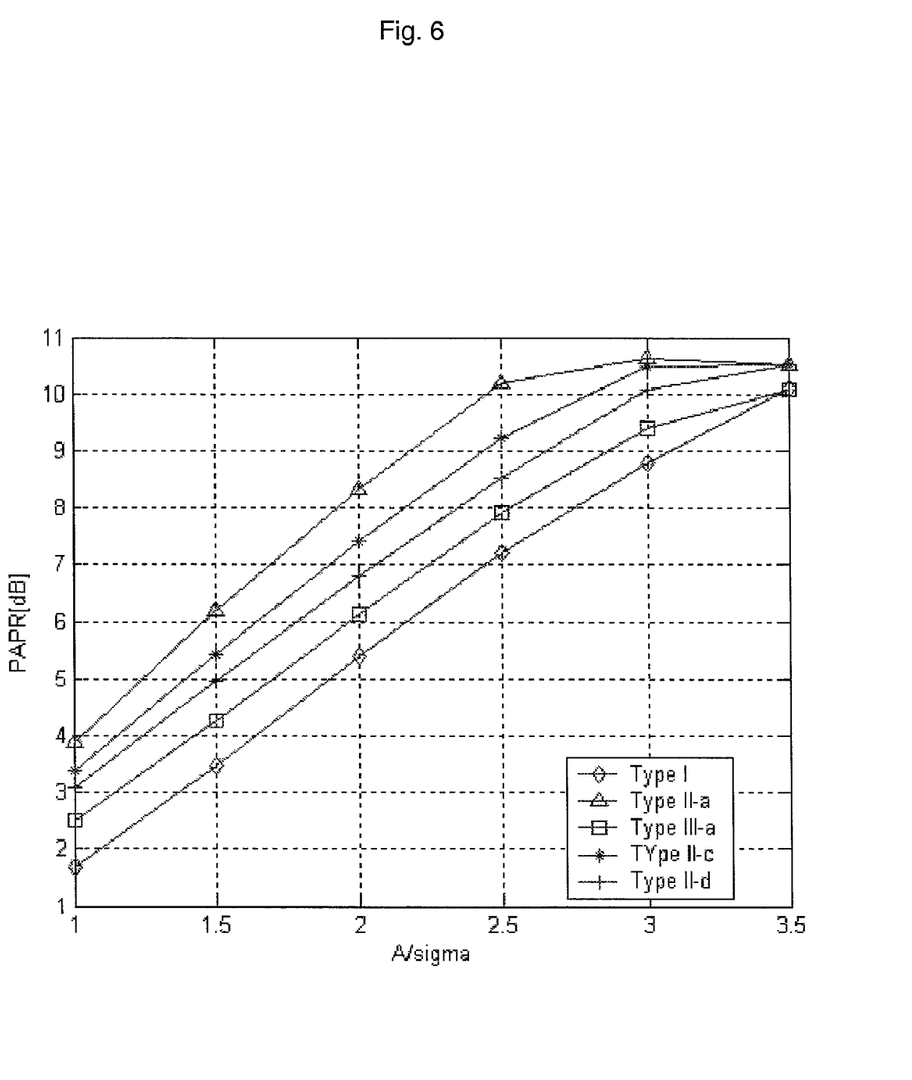
FIG. 6 shows a graph for representing a peak-to-average power ratio (PAPR) in the method for clipping the transmission signal according to the exemplary embodiment of the present invention.

FIG. 5 shows a graph for representing an error vector magnitude (%) in the method for clipping the transmission signal according to the exemplary embodiment of the present invention, and FIG. 6 shows a graph for representing the PAPR in the method for clipping the transmission signal according to the exemplary embodiment of the present invention.

The EVM according to the respective clipping methods is calculated as shown in FIG. 5 by comparing performance of the clipped transmission signals, and the PAPR is calculated as shown in FIG. 6 when the clipping operation is performed according to the clipping method.

Types II-a, II-b, and II-c of FIG. 5 respectively show the EVM when the clipping operation is performed by using different clipping levels in the same clipping method. In addition, Types II-a, Type II-b, and Type II-c respectively show the EVM when the clipping level is respectively A, L1, and between A and L1.

With reference to performance of Type I, the PAPR of Type II-c maintaining the same performance as Type I is not reduced by a large amount. With reference to Type III-a according to the exemplary embodiment of the present invention, while Type II-d shows similar performance, the PAPR is also not reduced by a large amount.

Accordingly, Type III-a shows better performance than Type II when the real and imaginary part signals are separately clipped without using the multiplier and the divider. In this method, the comparator is added since the clipping level is added.

While the two clipping levels are used in the exemplary embodiment of the present invention, a difference between the EVM of Type III-a and the same of Type III-b is great. At this time, the added clipping levels L1 and L2 are given as shown in Math Figures 8 and 9.

$$L_1 = A \times 1/\sqrt{2}$$  Math Figure 8

$$L_2 = A \times (\sqrt{2}-1)$$  Math Figure 9

While the added clipping levels L1 and L2 are given as shown in Math Figures 8 and 9, the present invention covers various modifications within the spirit and scope of the appended claims.

According to the exemplary embodiment of the present invention, the high PAPR may be reduced since the digital clipping is performed by the two comparators in the transmitter of the OFDMA system.

In addition, the performance is further improved compared to the conventional clipping method since the real and imaginary parts are separately clipped according to the exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A digital clipping method for clipping an Orthogonal Frequency Division Multiplexing (OFDM) transmission signal, the method comprising:
    a) dividing the transmission signal into real and imaginary parts;
    b) dividing magnitudes of the real and imaginary part signals into a plurality of clipping sections that have different clipping levels; and
    c) clipping the real and imaginary parts of the transmission signal by comparing each of the real and imaginary parts with each of the plurality of clipping levels of the clipping sections while allowing a phase error,
    wherein two comparators are used to compare the real and imaginary parts with three clipping levels A, L1, and L2 when the three clipping levels are provided as the plurality of clipping levels, and wherein the clipped real part $y_i(n)$ of the signal $y(n)$ in c) is given as $$y_i(n) = \begin{cases} A, & \text{if } x_i(n) > A, |x_q(n)| < L_2 \\ x_i(n), & \text{if } |x_i(n)| \le A, |x_q(n)| < L_2 \\ -A & \text{if } x_i(n) < -A, |x_q(n)| < L_2 \\ L_1 & \text{if } x_i(n) > L_1, |x_q(n)| \ge L_2 \\ x_i(n), & \text{if } |x_i(n)| \le L_1, |x_q(n)| \ge L_2 \\ -L_1 & \text{if } x_i(n) < -L_1, |x_q(n)| \ge L_2, \end{cases}$$

wherein the transmission signal $x(n)$ is expressed by a real part $x_i(n)$ and an imaginary part $jx_q(n)$, as $x(n)=x_i(n)+jx_q(n)$.

2. The digital clipping method of claim 1, wherein, in c), a plurality of comparators are used to compare the real and imaginary parts of the complex number transmission signal with the plurality of clipping levels.

3. The digital clipping method of claim 2, wherein the clipping sections in b) are divided by the first, second, and third clipping levels A, L1, and L2, respectively, wherein L1 is given as L1=Ax(1/√2) and L2 is given as L2=Ax(√2−1).

4. The digital clipping method of claim 3, wherein the clipped real part of the transmission signal in c) has at least one of 6 values according to the respective clipping sections defined by the first, second, and third clipping levels A, L1, and L2, respectively, wherein the clipped signal $y(n)$ is expressed by a real part $y_i(n)$ and an imaginary part $jy_q(n)$, as $y(n)=y_i(n)+jy_q(n)$.

5. The digital clipping method of claim 1, wherein the clipping sections have a respective clipping level,
wherein the step (c) compares the real and imaginary parts with each clipping level of the clipping sections.

* * * * *